US009579776B2

(12) United States Patent
Arimura et al.

(10) Patent No.: US 9,579,776 B2
(45) Date of Patent: Feb. 28, 2017

(54) ELECTRIC POWER TOOL (71) Applicant: Panasonic Corporation, Osaka (JP)

(72) Inventors: Tadashi Arimura, Kyoto (JP);
Toshiharu Ohashi, Shiga (JP);
Hiroyuki Kaizo, Kyoto (JP); Fumiaki Sekino, Osaka (JP); Kenichirou Inagaki, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 389 days.

(21) Appl. No.: 14/202,107

(22) Filed: Mar. 10, 2014

(65) Prior Publication Data
US 2014/0262390 A1  Sep. 18, 2014

(30) Foreign Application Priority Data

Mar. 13, 2013 (JP) ................................ 2013-050145

(51) Int. Cl.
*B25B 23/147* (2006.01)
*B25B 21/02* (2006.01)
(Continued)

(52) U.S. Cl.
CPC ............ *B25B 21/02* (2013.01); *B25B 21/026* (2013.01); *B25B 23/1405* (2013.01);
(Continued)

(58) Field of Classification Search
CPC .............. B25B 23/147; B25B 23/1405; B25B 23/1475; B25B 21/00; B25B 21/02; B25F 5/00; B25F 5/001; B23B 45/008
(Continued)

(56) References Cited

U.S. PATENT DOCUMENTS 5,731,673 A * 3/1998 Gilmore ............... B23P 19/066
173/178
6,536,536 B1 * 3/2003 Gass ..................... B23B 31/123
173/171

(Continued)

FOREIGN PATENT DOCUMENTS

CN  2219185 Y   2/1996
CN  1781672 A   6/2006
(Continued)

OTHER PUBLICATIONS

Chinese Office Action and Search Report for corresponding Chinese Application No. 201410088369.2 dated Jun. 5, 2015 and English translation of Search Report.
(Continued)

*Primary Examiner* — Scott A. Smith
(74) *Attorney, Agent, or Firm* — Renner, Otto, Boisselle & Sklar, LLP (57) ABSTRACT

An electric power tool includes a voltage step-up condition setting operation unit that serves as a human machine interface and a voltage converter capable of performing a voltage step-up operation to raise a voltage supplied from a power supply and supply a raised voltage to a motor. The voltage converter is further capable of changing a voltage step-up level in the voltage step-up operation in accordance with the operation of the voltage step-up condition setting operation unit. A driving state detection unit generates a driving state signal corresponding to a driving state of the electric power tool. A control unit controls a stop timing of the motor in accordance with the driving state signal.

10 Claims, 4 Drawing Sheets

(51) Int. Cl.
*B25B 23/14* (2006.01)
*H02P 7/295* (2016.01)

(52) U.S. Cl.
CPC .......... *B25B 23/1475* (2013.01); *H02P 7/295* (2013.01); *B25B 23/147* (2013.01); *H02P 2201/09* (2013.01)

(58) Field of Classification Search
USPC .... 173/2, 176, 178, 128, 181, 183, 93, 93.6, 173/217; 318/430, 434, 12, 139; 320/114, 132
See application file for complete search history.

(56) References Cited

U.S. PATENT DOCUMENTS

| | | | | |
|---|---|---|---|---|
| 6,655,471 | B2* | 12/2003 | Cripe | B25B 23/1405 173/1 |
| 6,664,748 | B2* | 12/2003 | Kushida | A47L 9/2805 15/319 |
| 6,687,567 | B2* | 2/2004 | Watanabe | B25B 23/1405 173/11 |
| 6,771,043 | B2* | 8/2004 | Matsunaga | H02J 7/0031 320/114 |
| 6,978,846 | B2* | 12/2005 | Kawai | B23P 19/066 173/176 |
| 7,007,762 | B2* | 3/2006 | Yamamoto | B25B 23/147 173/1 |
| 7,135,791 | B2* | 11/2006 | Kushida | B25B 21/00 307/150 |
| 7,155,986 | B2* | 1/2007 | Kawai | B25B 21/02 73/862.21 |
| 7,334,648 | B2* | 2/2008 | Arimura | B25B 21/02 173/176 |
| 7,770,658 | B2* | 8/2010 | Ito | B23P 19/066 173/1 |
| 7,882,900 | B2* | 2/2011 | Borinato | B23B 45/008 173/176 |
| 8,179,069 | B2* | 5/2012 | Matsunaga | H02P 6/08 318/430 |
| 8,272,452 | B2* | 9/2012 | Katou | B25D 11/005 173/176 |
| 8,708,861 | B2* | 4/2014 | Inagaki | B23B 45/008 173/178 |
| 9,089,956 | B2 | 7/2015 | Arimura et al. | |
| 2003/0121685 | A1 | 7/2003 | Yamamoto | |
| 2005/0263305 | A1* | 12/2005 | Shimizu | B25B 23/1405 173/2 |
| 2006/0113934 | A1 | 6/2006 | Kushida et al. | |
| 2009/0160371 | A1* | 6/2009 | Inagaki | B25F 5/001 318/12 |
| 2012/0010043 | A1 | 1/2012 | Inagaki et al. | |
| 2013/0133912 | A1 | 5/2013 | Mizuno et al. | |
| 2013/0154584 | A1 | 6/2013 | Sakaue et al. | |

FOREIGN PATENT DOCUMENTS

| | | |
|---|---|---|
| CN | 101396810 B | 9/2010 |
| CN | 102310398 A | 1/2012 |
| EP | 1 260 170 A1 | 11/2002 |
| EP | 1 524 085 A1 | 4/2005 |
| JP | 09-183072 | 7/1979 |
| JP | 02-100882 A | 4/1990 |
| JP | 03-079279 A | 4/1991 |
| JP | 05-123975 | 5/1993 |
| JP | 11-090845 | 4/1999 |
| JP | 3188507 B2 | 5/2001 |
| JP | 2005-278375 A | 10/2005 |
| JP | 2012-071362 A | 4/2012 |
| JP | 2012-191838 A | 10/2012 |
| WO | WO 2010/034162 A1 | 4/2010 |
| WO | WO 2012/017833 A1 | 2/2012 |
| WO | WO 2012/023452 A1 | 2/2012 |

OTHER PUBLICATIONS

Extended European Search Report for corresponding European Application No. 14158459.9 dated Feb. Feb. 1, 2016.

\* cited by examiner

ELECTRIC POWER TOOL

CROSS-REFERENCE TO RELATED APPLICATIONS

This application is based upon and claims the benefit of priority from prior Japanese Patent Application No. 2013-050145, filed on Mar. 13, 2013, the entire contents of which are incorporated herein by reference.

FIELD

The present invention relates to an electric power tool.

BACKGROUND

Japanese Patent No. 3188507 describes an example of a conventional electric power tool. The electric power tool includes a power supply having a primary battery or a rechargeable secondary battery, a motor, and a control unit for controlling voltage supply from the power supply to the motor.

In the electric power tool, the voltage of the power supply decreases according to use. When the voltage of the power supply decreases, a fastening torque of a working subject component, such as a screw or a bolt, decreases.

SUMMARY

One aspect of the present invention is an electric power tool. The electric power tool includes a power supply, a motor including a drive shaft, a tool output shaft configured to be driven based on a torque of the drive shaft of the motor, a voltage step-up condition setting operation unit that serves as a human machine interface, and a voltage converter capable of performing a voltage step-up operation to raise a voltage supplied from a power supply and supply a raised voltage to a motor. The voltage converter is further capable of changing a voltage step-up level in the voltage step-up operation in accordance with the operation of the voltage step-up condition setting operation unit. The electric power tool further includes a driving state detection unit configured to generate a driving state signal corresponding to a driving state of the electric power tool and a control unit configured to control a stop timing of the motor in accordance with the driving state signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

Figure 1:
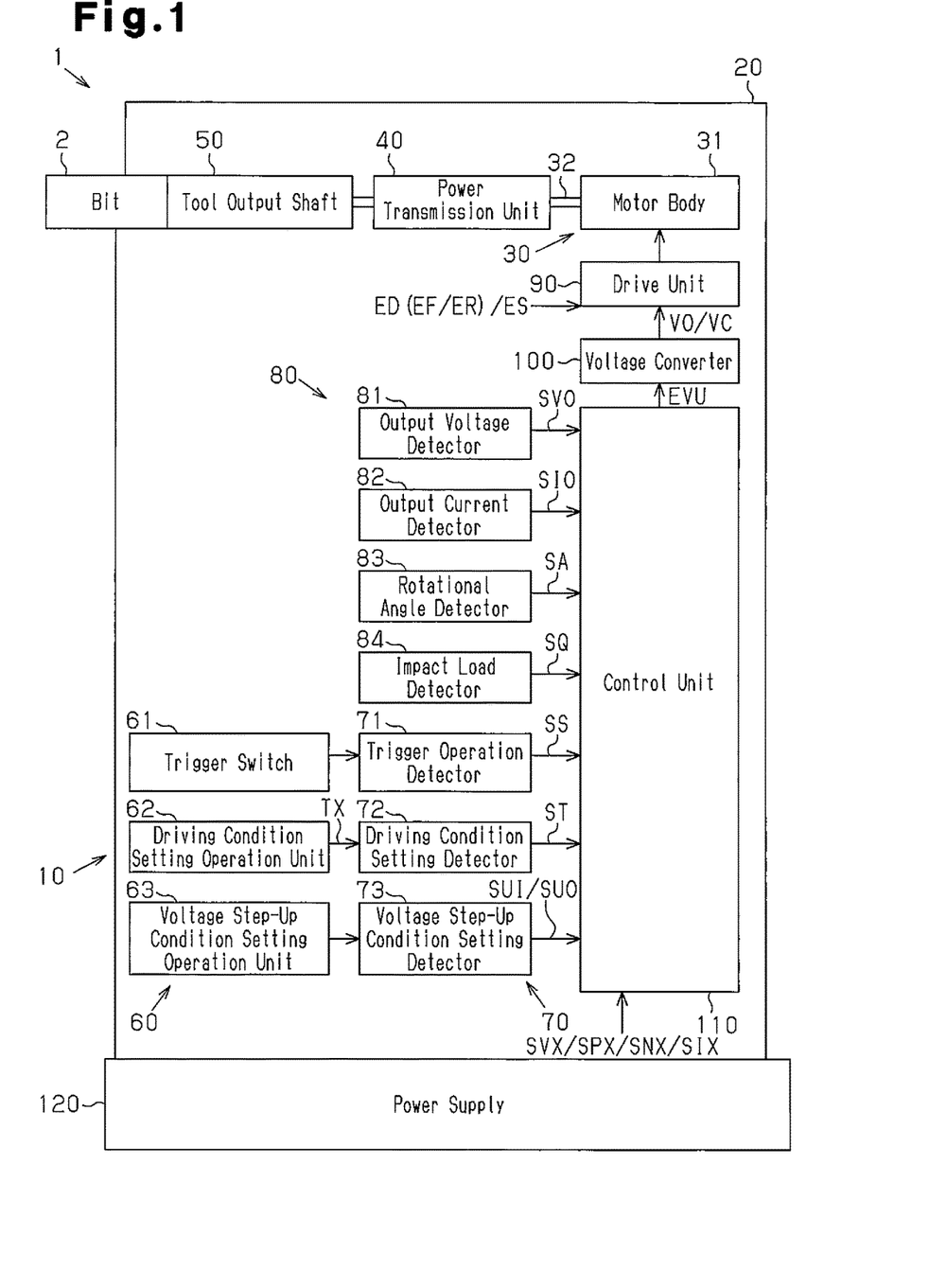
FIG. 1 is a schematic block diagram of an electric power tool.

FIG. 1 shows an embodiment of an electric power tool 1. The electric power tool 1 is, for example, a hitting tool such as an impact driver or an impact wrench. The electric power tool 1 includes an electric power tool body 10 and a power supply 120, which are attached to and detached from each other. The electric power tool 1 transmits a torque to a working subject component via a bit 2 connected to the electric power tool body 10. The working subject component is, for example, a screw or a bolt.

The electric power tool body 10 includes a housing 20, a motor 30, a power conversion unit 40, a tool output shaft 50, an operation unit 60, an operation state detection unit 70, a driving state detection unit 80, a drive unit 90, a voltage converter 100, and a control unit 110. A power block of the electric power tool body 10 is driven by power supplied from the power supply 120. The power block of the electric power tool body 10 includes the motor 30, the operation state detection unit 70, the driving state detection unit 80, the drive unit 90, the voltage converter 100, and the control unit 110.

The housing 20 can be grasped by the user. The housing 20 accommodates the components of the electric power tool body 10. The housing 20 has a part connected to the power supply 120 in a lower portion.

The motor 30 is arranged in the housing 20. The motor 30 includes a motor body 31 and a drive shaft 32 that serves as an output shaft of the motor 30. The motor 30 is driven by power supplied from the drive unit 90. The motor 30 is operable in a forward rotation mode and a reverse rotation mode. In the forward rotation mode, the drive shaft 32 rotates in a forward rotation direction. In the reverse rotation mode, the drive shaft 32 rotates in a reverse rotation direction.

The power conversion unit 40 is arranged in the housing 20. The power conversion unit 40 decelerates rotation of the drive shaft 32 and transmits the decelerated rotation to the tool output shaft 50. The power conversion unit 40 converts a torque of the drive shaft 32 into an impact load and hits the tool output shaft 50 based on the impact load.

The tool output shaft 50 has a bottom end located in the housing 20 and a front end exposed from the housing 20. The tool output shaft 50 can be attached to and detached from the bit 2. The tool output shaft 50 rotates the bit 2 by the torque transmitted from the power conversion unit 40. The tool output shaft 50 changes a fastening torque TC acting on the working subject component.

The operation unit 60 includes a trigger switch 61, a driving condition setting operation unit 62, and a voltage step-up condition setting operation unit 63. The operation unit 60 is arranged in the housing 20. The operation unit 60 is used for the user to change the driving state of the electric power tool 1.

The trigger switch 61 serves as a human machine interface and is used to adjust an output of the motor 30. The user can continuously operate the trigger switch 61 within a range from an output stop position to a maximum output position. A pushing amount of the trigger switch 61 into the housing 20 is the smallest at the output stop position and is the largest at the maximum output position.

The driving condition setting operation unit 62 serves as a human machine interface and is used to set a prescribed torque TX for stopping rotation of the motor 30. The user can operate the driving condition setting operation unit 62 in steps within a range from a minimum value setting position to maximum value setting position.

The voltage step-up condition setting operation unit 63 serves as a human machine interface and is used to set the voltage step-up operation of the voltage converter 100. The user can selectively operate the voltage step-up condition setting operation unit 63 to a voltage step-up stop position, a low step-up level position, or a high step-up level position.

When the voltage step-up condition setting operation unit 63 is set to the voltage step-up stop position, the voltage converter 100 does not perform the voltage step-up operation. When the voltage step-up condition setting operation unit 63 is set to the low step-up level position, the voltage converter 100 performs the voltage step-up operation in accordance with a relatively low step-up level. When the voltage step-up condition setting operation unit 63 is set to the high step-up level position, the voltage converter 100 performs the voltage step-up operation in accordance with a relatively high step-up level, which is higher than that at the low step-up level position.

The operation state detection unit 70 includes a trigger operation detector 71, a driving condition setting detector 72, and a voltage step-up condition setting detector 73. The operation state detection unit 70 supplies a detection signal, corresponding to the operation of each of the trigger switch 61, the driving condition setting operation unit 62, and the voltage step-up condition setting operation unit 63, to the control unit 110.

The trigger operation detector 71 detects the operational position of the trigger switch 61 and supplies a trigger operation signal SS, corresponding to the operational position of the trigger switch 61, to the control unit 110. When the trigger switch 61 is located at any operational position other than the output stop position, the trigger operation detector 71 generates the trigger operation signal SS corresponding to the operational amount of the trigger switch 61. When the trigger switch 61 is located at the output stop position, the trigger operation detector 71 does not output the trigger operation signal SS.

The driving condition setting detector 72 detects the operational position of the driving condition setting operation unit 62 and supplies a setting torque signal ST, corresponding to the operational position of the driving condition setting operation unit 62, to the control unit 110.

The voltage step-up condition setting detector 73 detects the operational position of the voltage step-up condition setting operation unit 63 and supplies a detection signal, corresponding to the operational position of the voltage step-up condition setting operation unit 63, to the control unit 110. When the voltage step-up condition setting operation unit 63 is located at the voltage step-up stop position, the voltage step-up condition setting detector 73 supplies a voltage step-up stop signal SUO to the control unit 110. When the voltage step-up condition setting operation unit 63 is located at the low step-up level position or the high step-up level position, the voltage step-up condition setting detector 73 supplies a voltage step-up driving signal SUI to the control unit 110.

The driving state detection unit 80 includes an output voltage detector 81, an output current detector 82, a rotational angle detector 83, and an impact load detector 84. The driving state detection unit 80 generates a driving state signal based on one or more of a plurality of parameters indicating the driving state of the electric power tool 1 and supplies the driving state signal to the control unit 110.

The output voltage detector 81 detects the voltage generated by the voltage converter 100 as an output voltage VO. The output voltage detector 81 includes a voltage detection circuit. The output voltage detector 81 supplies an output voltage signal SVO, corresponding to the output voltage VO, to the control unit 110. The output voltage signal SVO is one of the driving state signals.

The output current detector 82 detects a current supplied from the voltage converter 100 to the motor 30 as an output current IO. The output current detector 82 includes a current detection circuit. The output current detector 82 supplies an output current signal SIO, corresponding to the output current IO, to the control unit 110. The output current signal SIO is one of the driving state signals.

The rotational angle detector 83 detects the rotational angle of the tool output shaft 50. The rotational angle detector 83 includes, for example, a rotary encoder. The rotational angle detector 83 supplies a rotational angle signal SA, corresponding to the rotation of the tool output shaft 50, to the control unit 110. The rotational angle signal SA is one of the driving state signals.

The impact load detector 84 detects an impact load acting on a hammer 43 of the power conversion unit 40. The impact load detector 84 includes, for example, an acceleration sensor. The impact load detector 84 supplies an impact load signal SQ, corresponding to the impact load acting on the hammer 43, to the control unit 110. The impact load signal SQ is one of the driving state signals.

The drive unit 90 operates according to a signal supplied from the control unit 110. When receiving a rotation driving signal ED from the control unit 110, the drive unit 90 supplies current to the motor 30. The drive unit 90 supplies a current having a magnitude corresponding to a command included in the rotation driving signal ED to the motor 30 by a switching operation. When receiving a forward rotation driving signal EF from the control unit 110, the drive unit 90 drives the motor 30 in the forward rotation mode. When receiving a reverse rotation driving signal ER from the control unit 110, the drive unit 90 drives the motor 30 in the reverse rotation mode. When receiving a rotation stop signal ES from the control unit 110, the drive unit 90 stops supply of the current to the motor 30.

The voltage converter 100 operates according to a signal supplied from the control unit 110. The voltage converter 100 can perform a voltage step-up operation, a voltage step-down operation, and a voltage conversion stop operation. In the voltage step-up operation, the voltage converter 100 raises a voltage supplied from the power supply 120 and supplies the raised voltage to the motor 30. In the voltage step-down operation, the voltage converter 100 lowers a voltage supplied from the power supply 120 and supplies the lowered voltage to the motor 30. In the voltage conversion stop operation, the voltage converter 100 directly supplies a voltage supplied from the power supply 120 to the motor 30 without converting (raising/lowering) the voltage.

The voltage converter 100 selectively performs a low step-up operation or a high step-up operation as the voltage step-up operation. In the low step-up operation, the voltage converter 100 raises a voltage supplied from the power supply 120 with the relatively low step-up level. In the high step-up operation, the voltage converter 100 raises a voltage supplied from the power supply 120 with the relatively high step-up level.

The control unit 110 supplies a signal for controlling the motor 30 to the drive unit 90 in accordance with various signals supplied from the operation state detection unit 70 and the driving state detection unit 80. Further, the control unit 110 supplies a signal for controlling the voltage converter 100 to the voltage converter 100 in accordance with various signals supplied from the operation state detection unit 70 and the driving state detection unit 80.

The control unit 110 supplies the rotation driving signal ED or the rotation stop signal ES to the drive unit 90 in accordance with the trigger operation signal SS and the signal from the driving state detection unit 80. The control unit 110 supplies the forward rotation driving signal EF to the drive unit 90 in response to a forward rotation setting signal from a rotational direction setting switch (not shown), and supplies the reverse rotation driving signal ER to the drive unit 90 in response to the reverse rotation setting signal from the rotational direction setting switch. The control unit 110 calculates the rotation amount of the tool output shaft 50 according to the rotational angle signal SA.

When the trigger operation signal SS is received and a load torque TL acting on the tool output shaft 50 is less than the prescribed torque TX, the control unit 110 supplies the rotation driving signal ED to the drive unit 90. When the trigger operation signal SS is received and the load torque TL is the prescribed torque TX or more, the control unit 110 supplies the rotation stop signal ES to the drive unit 90. The load torque TL of the tool output shaft 50 correlates with a load torque acting on the drive shaft 32 of the motor 30. Accordingly, the control unit 110 determines the load torque TL of the tool output shaft 50 based on the load torque of the drive shaft 32.

Figure 2A:
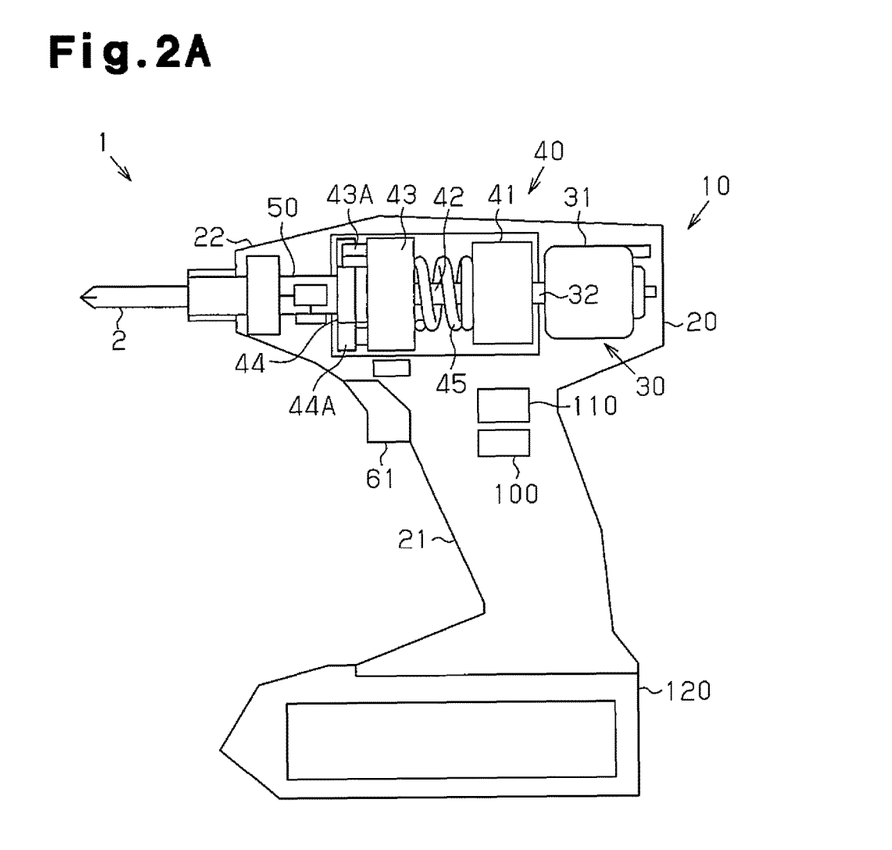
FIG. 2A is a schematic view showing the structure of the electric power tool.

FIG. 2A shows an example of the structure of the electric power tool 1.

The housing 20 includes a grip 21 and a body 22. The grip 21 is integrated with the body 22. The grip 21 accommodates the voltage converter 100 and the control unit 110. The body 22 accommodates the motor 30, the power conversion unit 40, the part of the tool output shaft 50, and the drive unit 90.

The power conversion unit 40 converts a torque of the motor 30 into an impact load and hits the tool output shaft 50 with the impact load. The power conversion unit 40 includes a deceleration mechanism 41, a power transmission shaft 42, the hammer 43, an anvil 44, and a load application component 45.

The deceleration mechanism 41 includes, for example, a planet gear mechanism. The deceleration mechanism 41 is connected to the drive shaft 32. The deceleration mechanism 41 decelerates rotation of the drive shaft 32 and transmits the decelerated rotation to the power transmission shaft 42.

The power transmission shaft 42 has a bottom end connected to an output shaft of the deceleration mechanism 41 and a front end connected to the hammer 43 via a cam structure not shown. The power transmission shaft 42 rotates integrally with the output shaft of the deceleration mechanism 41.

When the load torque TL does not act on the tool output shaft 50 or the load torque TL is small, the hammer 43 rotates integrally with the power transmission shaft 42. When the load torque TL acting on the tool output shaft 50 is large, the hammer 43 rotates relative to the power transmission shaft 42. When the hammer 43 rotates relative to the power transmission shaft 42, the cam structure moves the hammer 43 relative to the power transmission shaft 42 in the axial direction of the power transmission shaft 42.

Figure 2B:
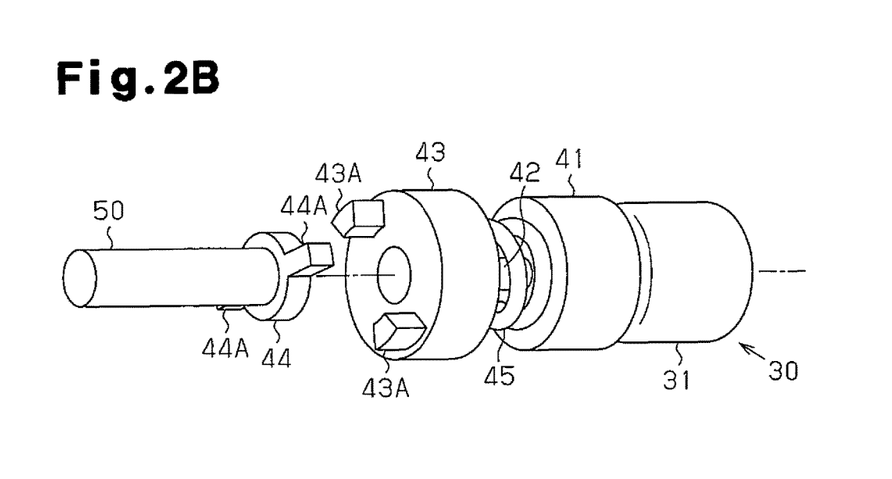
FIG. 2B is a schematic view showing a power conversion unit of the electric power tool of FIG. 2A.

As shown in FIG. 2B, the hammer 43 includes two input-side protrusions 43A formed on the end surface of the hammer 43 opposed to the anvil 44. The hammer 43 is annular, and the two input-side protrusions 43A are circumferentially arranged on the end surface of the hammer 43 at regular intervals.

The anvil 44 is supported by part of the body 22 and rotatable in relative to the body 22 and the hammer 43. The anvil 44 is connected to the tool output shaft 50.

The anvil 44 includes two output-side protrusions 44A opposed to the hammer 43. The anvil 44 is annular, and the two output-side protrusions 44A are formed on the edge of the anvil 44 at regular intervals.

The load application component 45 is arranged around the power transmission shaft 42 between the deceleration mechanism 41 and the hammer 43. The load application component 45 is, for example, a coil spring. The load application component 45 applies a load to the hammer 43 in the axial direction of the power transmission shaft 42. The load presses the hammer 43 onto the anvil 44. Accordingly, the load applied to the hammer 43 by the load application component 45 acts on the anvil 44. The input-side protrusions 43A and the output-side protrusions 44A are alternately arranged in the circumferential direction.

The tool output shaft 50 has a bottom end connected to the anvil 44 and a front end connectable to the bit 2. The tool output shaft 50 rotates integrally with the anvil 44 and the bit 2.

The impact load detector 84 is fixed to the body 22. The impact load detector 84 is arranged near the hammer 43. The impact load detector 84 supplies the impact load signal SQ, corresponding to the impact load of the hammer 43, to the control unit 110.

Next, the operation of the power conversion unit 40 will now be described in detail.

The control unit 110 supplies the rotation driving signal ED to the drive unit 90 based on the operation of the trigger switch 61. The drive unit 90 supplies a current to the motor 30 in accordance with the rotation driving signal ED. The motor 30 rotates the drive shaft 32 in accordance with the current supplied from the drive unit 90. The deceleration mechanism 41 rotates the power transmission shaft 42 based on the rotation of the drive shaft 32. With the rotation of the power transmission shaft 42, the hammer 43 rotates relative to the anvil 44. Then, the input-side protrusions 43A of the hammer 43 make contact with the output-side protrusions 44A of the anvil 44.

When the load torque TL acting on the tool output shaft 50 is small, the hammer 43 and the anvil 44 are integrally rotated by the contact of the input-side protrusions 43A with the output-side protrusions 44A. As a result, the anvil 44 rotates the tool output shaft 50 and the bit 2.

When the load torque TL is large, the hammer 43 rotates relative to the power transmission shaft 42 and the anvil 44, and the input-side protrusions 43A run onto the respective output-side protrusions 44A. When the hammer 43 rotates relative to the power transmission shaft 42, the hammer 43 moves away from the anvil 44 in the axial direction of the power transmission shaft 42. As a result, the compressive deformed amount of the load application component 45 is increased by pressing of the hammer 43.

The hammer 43 moves by a predetermined amount in the axial direction and then, moves toward the anvil 44 due to the load applied from the load application component 45 while rotating relative to the power transmission shaft 42 and the anvil 44. Then, the input-side protrusions 43A hit against the output-side protrusions 44A while rotating. As a result, the input-side protrusions 43A hit the output-side protrusions 44A in the rotational direction. Thus, the anvil 44 rotates relative to the hammer 43 due to the impact load applied from the hammer 43. Then, the tool output shaft 50 and the bit 2 rotate integrally with the anvil 44.

The hammer 43 repeatedly hits the anvil 44 every predetermined rotation amount. Thus, when the load torque TL is large, the anvil 44 rotates the tool output shaft 50 and the bit 2 by the intermittently applied impact load. Hitting of the hammer 43 to the anvil 44 corresponds to hitting of the power conversion unit 40 to the tool output shaft 50.

The control unit 110 performs motor control. The motor control is achieved, for example, by using hardware. The control unit 110 controls the operation of each functional block of the control unit 110 to perform the following motor control.

The control unit 110 determines whether a hitting stroke of the electric power tool 1 is a former stage or a latter stage. The control unit 110 calculates the rotation amount of the tool output shaft 50, which is generated by one hitting of the hammer 43, as a unit hitting rotation amount RB and determines the stage of the hitting stroke based on the unit hitting rotation amount RB. The control unit 110 calculates the unit hitting rotation amount RB in accordance with the rotational angle signal SA.

The hitting stroke corresponds to a period from when the impact load starts to be applied to the working subject component to when the fastening torque of the working subject component reaches at a prescribed fastening torque. The former stage of the hitting stroke corresponds to a period in which the unit hitting rotation amount RB is greater than or equal to a reference rotation amount RBX. The latter stage of the hitting stroke corresponds to a period in which the unit hitting rotation amount RB is less than the reference rotation amount RBX.

The reference rotation amount RBX is set as a reference value for determining whether or not a certain level of correlation between the unit hitting rotation amount RB and the fastening torque is ensured. When the calculation value of the unit hitting rotation amount RB is greater than or equal to the reference rotation amount RBX, the control unit 110 determines that good correlation (a certain level of correlation) between the unit hitting rotation amount RB and the fastening torque is maintained. When the calculation value of the unit hitting rotation amount RB is less than the reference rotation amount RBX, the control unit 110 determines that the good correlation between the unit hitting rotation amount RB and the fastening torque is not maintained.

The unit hitting rotation amount RB decreases with the increase in the fastening torque. When the fastening torque is sufficiently large, the unit hitting rotation amount RB has a minute value less than the reference rotation amount RBX. When the unit hitting rotation amount RB is the minute value, an error between the value calculated by the control unit 110 and an actual value of the unit hitting rotation amount RB may occur. Therefore, there is a possibility that the good correlation between the unit hitting rotation amount RB and the fastening torque is not maintained.

The control unit 110 detects a hitting timing at which the hammer 43 hits the anvil 44 in accordance with the impact load signal SQ. For example, control unit 110 detects the hitting timing based on a peak of the impact load signal SQ. The control unit 110 calculates the rotation amount of the tool output shaft 50 in a period between two consecutive hitting timings, as the unit hitting rotation amount RB.

The control unit 110 compares the calculation value of the unit hitting rotation amount RB with a reference rotation amount signal SBX indicating the reference rotation amount RBX, and determines the stage of the hitting stroke based on the comparison result. When the unit hitting rotation amount RB is greater than or equal to the reference rotation amount RBX, the control unit 110 determines that the hitting stroke belongs to the former stage. When the hitting stroke belongs to the former stage, the control unit 110 continues to compare the calculation value of the unit hitting rotation amount RB with the reference rotation amount signal SBX.

When the unit hitting rotation amount RB is less than the reference rotation amount RBX, the control unit 110 determines that the hitting stroke belongs to the latter stage. When the hitting stroke belongs to the latter stage, the control unit 110 calculates the number of hits BN the hammer 43 hits the anvil 44. For example, the control unit 110 acquires the number of times the hitting timing is detected, as the number of hits BN.

The fastening torque correlates with the number of hits BN. The fastening torque increases with the increase in the number of hits BN. The control unit 110 determines whether or not the load torque TL is greater than or equal to the prescribed torque TX based on whether or not the number of hits BN is greater than or equal to a reference number of hits BNX.

When the number of hits BN is less than the reference number of hits BNX, the control unit 110 determines that the load torque TL is less than the prescribed torque TX. When the number of hits BN is the reference number of hits BNX or more, the control unit 110 determines that the load torque TL is the prescribed torque TX or more. When the number of hits BN is the reference number of hits BNX or more, the control unit 110 stops the driving of the motor 30.

Figure 3:
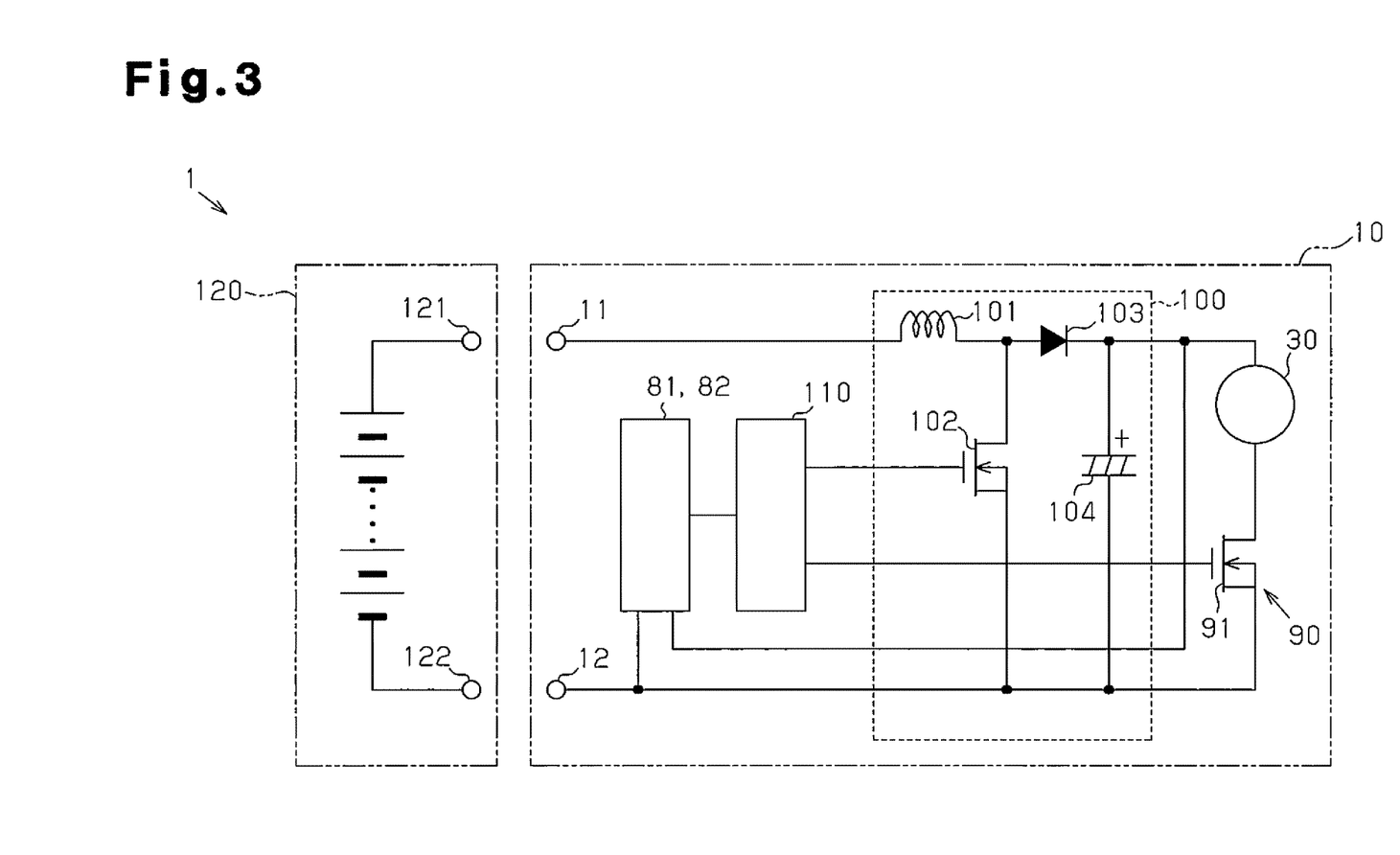
FIG. 3 is a circuit diagram of the electric power tool.

FIG. 3 shows an example of a circuit structure of the electric power tool 1.

The electric power tool body 10 includes a positive input terminal 11 and a negative input terminal 12. For example, the power supply 120 is provided as a battery pack. The power supply 120 includes at least one of a primary battery and a rechargeable secondary battery. The power supply 120 includes a positive input terminal 121 and a negative input terminal 122. When the power supply 120 is connected to the electric power tool body 10, the positive input terminal 11 is connected to the positive input terminal 121, and the negative input terminal 12 is connected to the negative input terminal 122. In this state, the power supply 120 supplies the voltage of the primary battery or the rechargeable secondary battery to the electric power tool body 10.

The voltage converter 100 includes, for example, a step-up chopper circuit. The step-up chopper circuit includes an inductor 101, a switching element 102, a diode 103, and a smoothing capacitor 104. The drive unit 90 includes a switching element 91. The switching element 102 and the switching element 91 are driven in accordance with a signal from the control unit 110.

For example, the output voltage detector 81 detects a potential difference between two terminals of the smoothing capacitor 104 as the output voltage VO. For example, the output current detector 82 detects the current flowing through the diode 103 as the output current IO.

In the voltage step-up operation, the voltage converter 100 raises the voltage supplied from the power supply 120 by the operation of the switching element 102 and supplies the raised voltage to the motor 30. In the voltage step-down operation, the voltage converter 100 lowers the voltage supplied from the power supply 120 by the operation of the switching element 102 and supplies the lowered voltage to the motor 30.

The control unit 110 may perform a starting voltage step-up control. The starting voltage step-up control is achieved, for example, by using hardware. The control unit 110 controls each functional block of the control unit 110 to perform the starting voltage step-up control.

When the trigger switch 61 is operated, the control unit 110 instructs the voltage converter 100 to start the voltage step-up operation. In the voltage step-up operation, the control unit 110 increases the voltage step-up level over time. For example, the control unit 110 may change the voltage step-up level of the voltage converter 100 by adjusting the duty ratio of the switching element 102.

When the voltage converter 100 performs the low step-up operation, the control unit 110 increases the voltage step-up level over time. When the voltage step-up level reaches at a prescribed low step-up level, the control unit 110 stops the increase in the voltage step-up level. For example, the prescribed low step-up level is set to a maximum value of the voltage step-up level in the low step-up operation.

When the voltage converter 100 performs the high step-up operation, the control unit 110 increases the voltage step-up level over time. When the voltage step-up level reaches at a prescribed high step-up level, the control unit 110 stops the increase in the voltage step-up level. For example, the prescribed high step-up level is set to a maximum value of the voltage step-up level in the high step-up operation.

After the starting voltage step-up control, the control unit 110 performs a voltage feedback control. In the voltage feedback control, the control unit 110 controls the voltage converter 100 such that the output voltage VO generated by the voltage converter 100 converges to a reference output voltage VX. The control unit 110 performs the voltage feedback control even when the starting voltage step-up control is not performed.

Figure 4:
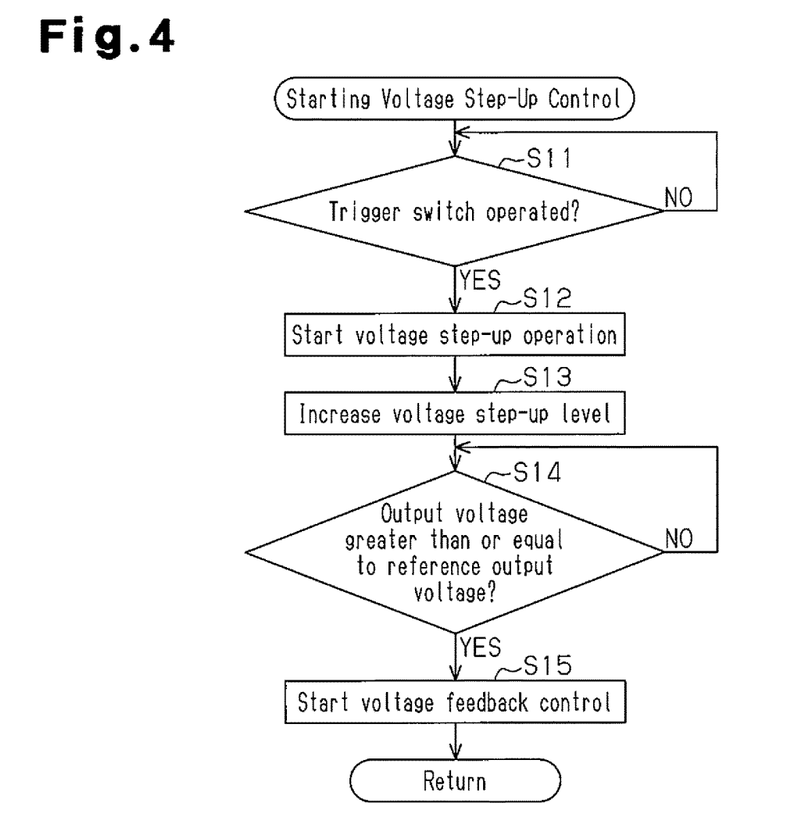
FIG. 4 is a flow chart schematically showing control of the electric power tool.

FIG. 4 is a flow chart showing the starting voltage step-up control.

In step S11, the control unit 110 determines whether or not the operation of the trigger switch 61 starts. When receiving the trigger operation signal SS from the trigger operation detector 71, the control unit 110 determines that the operation of the trigger switch 61 starts. The control unit 110 repeats step S11 until the operation of the trigger switch 61 starts. When the operation of the trigger switch 61 starts, the control unit 110 proceeds to step S12.

In step S12, the control unit 110 supplies a voltage step-up execution signal EVU to the voltage converter 100. The control unit 110 supplies the voltage step-up execution signal EVU at a predetermined timing in response to the trigger operation signal SS. The predetermined timing is when or after the trigger operation signal SS is received.

The control unit 110 controls the voltage step-up operation in accordance with the operational position of the voltage step-up condition setting operation unit 63. When receiving the voltage step-up driving signal SUI, the control unit 110 performs the starting voltage step-up control. In this case, the control unit 110 instructs the voltage converter 100 to start the low step-up operation or the high step-up operation based on information included in the voltage step-up driving signal SUI. When receiving the voltage step-up stop signal SUO, the control unit 110 does not perform the voltage step-up control. However, when receiving the voltage step-up stop signal SUO, the control unit 110 does not perform the starting voltage step-up control but may perform a standard step-up control. In this case, the control unit 110 instructs the voltage converter 100 to start a standard step-up operation based on the operational amount of the trigger operation signal SS. That is, even when the voltage step-up stop signal SUO is supplied to the control unit 110, the voltage converter 100 may perform the standard step-up operation. In the standard step-up operation, the control unit 110 does not change the voltage step-up level over time.

In step S13, after start of driving of the motor 30, the control unit 110 increases the voltage step-up level of the voltage converter 100 over time. For example, the voltage step-up execution signal EVU includes information on the voltage step-up level, and the control unit 110 increases the voltage step-up level by changing the information every output cycle of the voltage step-up execution signal EVU. For example, the control unit 110 increases the voltage step-up level of the voltage converter 100 at a constant rate.

In step S14, the control unit 110 determines whether or not the output voltage VO is greater than or equal to the reference output voltage VX. The control unit 110 compares the output voltage signal SVO with a reference output voltage signal SVX to determine whether or not the output voltage VO is greater than or equal to the reference output voltage VX. The reference output voltage signal SVX indicating the reference output voltage VX is supplied to the control unit 110. The reference output voltage signal SVX includes information corresponding to the voltage step-up operation. That is, when the voltage converter 100 performs the low step-up operation, the reference output voltage signal SVX indicates the reference output voltage VX corresponding to the low step-up operation. When the voltage converter 100 performs the high step-up operation, the reference output voltage signal SVX indicates the reference output voltage VX corresponding to the high step-up operation. When the starting voltage step-up control is not performed and the voltage converter 100 performs the standard step-up operation, the reference output voltage signal SVX indicates the reference output voltage VX corresponding to the standard step-up operation.

When the output voltage VO is less than the reference output voltage VX, the control unit 110 repeats step S14. When the output voltage VO is greater than or equal to the reference output voltage VX, the control unit 110 proceeds to step S15.

In step S15, the control unit 110 starts the voltage feedback control. At this time, when the starting voltage step-up control is performed, the control unit 110 stops the increase in the voltage step-up level (if has not stopped yet). In the voltage feedback control, the control unit 110 controls the voltage converter 100 in accordance with the output voltage signal SVO and the reference output voltage signal SVX so that the output voltage VO converges to the reference output voltage VX.

Figure 5:
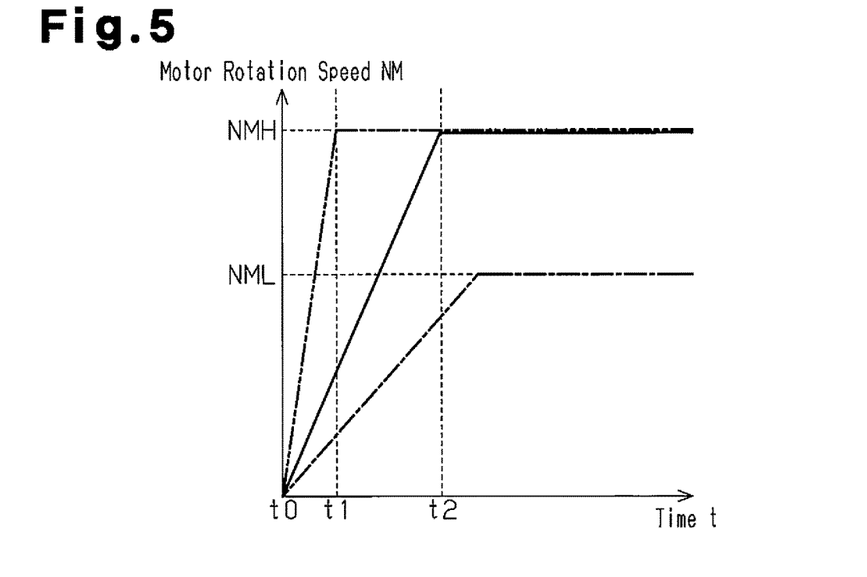
FIG. 5 is a graph schematically showing an example of the relationship between driving time and motor rotation speed.

FIG. 5 shows change of the rotation speed of the motor 30 depending on the operational mode of the voltage converter 100. The rotation speed of the motor 30 per unit time will be hereinafter referred to as a motor rotation speed NM.

The voltage converter 100 is operable in a plurality of operational modes. For example, in a first operational mode, the voltage converter 100 performs the high step-up operation while changing the voltage step-up level based on the starting voltage step-up control. In a second operational mode, the voltage converter 100 performs the high step-up operation at a constant step-up level without performing the starting voltage step-up control. In a third operational mode, the voltage converter 100 does not perform the voltage step-up operation and the voltage step-down operation. Further, the voltage converter 100 may operate in other operational modes, for example, a mode of performing the low step-up operation while changing the voltage step-up level based on the starting voltage step-up control, or a mode of performing the low step-up operation at a constant step-up level without performing the starting voltage step-up control. In FIG. 5, a solid line indicates a change in the motor rotation speed NM in the first operational mode. A double-dashed line indicates a change in the motor rotation speed NM in the second operational mode. A dashed line indicates a change in the motor rotation speed NM in the third operational mode.

At time t0, the operation of the trigger switch 61 is started.

In the first operational mode and the second operational mode, the voltage converter 100 starts the high step-up operation at time t0. In the third operational mode, the voltage converter 100 does not start the voltage step-up operation. In any of the first to third operational modes, after time t0, the motor rotation speed NM increases at a constant rate. The increase rate of the motor rotation speed NM in the first operational mode is smaller than the increase rate of the motor rotation speed NM in the second operational mode and is larger than the increase rate of the motor rotation speed NM in the third operational mode.

The motor rotation speed NM in the second operational mode reaches at a rotational rate NMH at time t1, and is kept at the rotational rate NMH after time t1. The motor rotation speed NM in the first operational mode reaches at the rotational rate NMH at time t2 after time t1, and is kept at the rotational rate NMH after time t2. The motor rotation speed NM in the third operational mode reaches at a rotational rate NML at time t3 after time t2, and is kept at the rotational rate NML after time t3.

The electric power tool 1 in the first embodiment has following advantages.

(1) The electric power tool 1 includes the voltage converter 100 that raises the voltage supplied from the power supply 120 and supplies the boosted voltage to the motor 30, thereby performing the voltage step-up operation. According to this structure, even when the voltage of the power supply 120 lowers, the output of the motor 30 is prevented from lowering. This suppresses a decrease in the fastening torque of the working subject component.

(2) The electric power tool 1 includes the control unit 110 that controls the stop timing of the motor 30 in accordance with the driving state signal indicating the driving state of the electric power tool 1. Thus, the electric power tool 1 may suppress variation in the fastening torque of the working subject component.

(3) The electric power tool 1 includes the voltage step-up condition setting operation unit 63 that is operable by the user. The voltage converter 100 may change the voltage step-up level in the voltage step-up operation in accordance with the operation of the voltage step-up condition setting operation unit 63. Thus, the proper voltage step-up level may be set according to the type of the working using the electric power tool 1.

(4) The control unit 110 performs the voltage feedback control. Thus, even when the voltage of the power supply 120 lowers, the motor 30 may be driven based on a constant voltage. As a result, the output of the motor 30 may be prevented from lowering.

(5) For example, in the screw fastening operation, the bit is fitted into a screw head. The bit 2 screws the screw into a fastened object by rotation of the motor 30. In this case, when the bit 2 is not properly fitted into the screw head, the bit 2 may be detached from the screw head during rotation of the motor 30. Such situation easily occurs when the rotation speed of the motor 30 is high.

In the conventional art, in the electric power tool having the voltage step-up function, when the motor is driven in the state where the voltage step-up function becomes active, the voltage step-up operation starts with a constant step-up level. In this case, immediately after start of driving of the motor, a high step-up voltage is supplied to the motor.

Thus, in the conventional electric power tool, at start of the operation (at start of driving of the motor), the bit is likely to be detached from the screw head. When the bit is detached from the screw head, the operator needs to fit the bit into the screw head again. This makes time required for fastening the screw longer.

In consideration of these matters, the voltage converter 100 performs the voltage step-up operation based on the starting voltage step-up control. In the starting voltage step-up control, the voltage converter 100 increases the voltage step-up level over time after start of the operation of the trigger switch 61. Thereby, as compared to the case where the starting voltage step-up control is not performed, the increase rate of the motor rotation speed NM lowers. Thus, in an initial stage of the operation of fastening the working subject component to the fastened object, the bit 2 is hard to be detached from the head of the working subject component. This may shorten operation time.

Second Embodiment

An electric power tool 1 in a second embodiment will now be described below.

The electric power tool 1 in the second embodiment basically includes the same components as those in the electric power tool 1 in the first embodiment. The same components are given the same reference numerals, and part of all of description thereof is omitted.

The electric power tool 1 in the second embodiment is different from the electric power tool 1 in the first embodiment mainly in the following point. In the motor control in the first embodiment, the control unit 110 determines that the hitting stroke shifts from the former stage to the latter stage based on the unit hitting rotation amount RB and then, determines whether or not the load torque TL reaches at the prescribed torque TX based on the number of hits BN. In the motor control in the second embodiment, in the entire hitting stroke (the former stage and the latter stage), the control unit 110 determines whether or not the load torque TL reaches at the prescribed torque TX based on the sum of the rotation amount of the tool output shaft 50 (hereinafter referred to as "summed rotation amount RP").

At start of the hitting stroke, the control unit 110 calculates the summed rotation amount RP. For example, the control unit 110 sums the unit hitting rotation amount RB to calculate the summed rotation amount RP. The control unit 110 compares the summed rotation amount RP with a reference summed rotation amount signal SPX indicating a reference summed rotation amount RPX, and determines whether or not the load torque TL reaches at the prescribed torque TX based on the comparison result.

The load torque TL correlates with the summed rotation amount RP. When the summed rotation amount RP is greater than or equal to the reference summed rotation amount RPX, the load torque TL is greater than or equal to the prescribed torque TX. Thus, the control unit 110 determines whether or not the summed rotation amount RP is greater than or equal to the reference summed rotation amount RPX, thereby determining whether or not the load torque TL is greater than or equal to the prescribed torque TX.

When the summed rotation amount RP is less than the reference summed rotation amount RPX, the control unit 110 determines that the load torque TL is less than the prescribed torque TX.

When the summed rotation amount RP is greater than or equal to the reference summed rotation amount RPX, the control unit 110 determines that the load torque TL is greater than or equal to the prescribed torque TX. When the load torque TL is greater than or equal to the prescribed torque TX, the control unit 110 stops rotation of the motor 30.

The electric power tool 1 in the second embodiment has the advantages (1) to (5) of the electric power tool 1 in the first embodiment.

Third Embodiment

An electric power tool 1 in a third embodiment will now be described below.

The electric power tool 1 in the third embodiment basically includes the same components as those in the electric power tool 1 in the first embodiment. The same components are given the same reference numerals, and part of all of description thereof is omitted.

The electric power tool 1 in the third embodiment is different from the electric power tool 1 in the first embodiment mainly in the following point. In the motor control in the first embodiment, the control unit 110 determines that the hitting stroke shifts from the former stage to the latter stage based on the unit hitting rotation amount RB and then, determines whether or not the load torque TL reaches at the prescribed torque TX based on the number of hits BN. In the motor control in the third embodiment, in the entire hitting stroke (the former stage and the latter stage), the control unit 110 determines whether or not the load torque TL reaches at the prescribed torque TX based on the number of hits BN.

The control unit 110 calculates the number of hits BN when the hitting stroke starts. The control unit 110 compares the number of hits BN with a reference number of hits signal SNX indicating the reference number of hits BNX, and determines whether or not the load torque TL reaches at the prescribed torque TX based on the comparison result.

The load torque TL correlates with the number of hits BN. When the number of hits BN is greater than or equal to the reference number of hits BNX, the load torque TL is greater than or equal to the prescribed torque TX. Thus, the control unit 110 determines whether or not the number of hits BN is greater than or equal to the reference number of hits BNX to determine whether or not the load torque TL is greater than or equal to the prescribed torque TX.

When the number of hits BN is less than the reference number of hits BNX, the control unit 110 determines that the load torque TL is less than the prescribed torque TX.

When the number of hits BN is greater than or equal to the reference number of hits BNX, the control unit 110 determines that the load torque TL is greater than or equal to the prescribed torque TX. When the load torque TL is greater than or equal to the prescribed torque TX, the control unit 110 stops rotation of the motor 30.

The electric power tool 1 in the third embodiment has the advantages (1) to (5) of the electric power tool 1 in the first embodiment.

Fourth Embodiment

An electric power tool 1 in a fourth embodiment will now be described below.

The electric power tool 1 in the fourth embodiment basically includes the same components as those in the electric power tool 1 in the first embodiment. The same components are given the same reference numerals, and part of all of description thereof is omitted.

The electric power tool 1 in the fourth embodiment is different from the electric power tool 1 in the first embodiment mainly in the following point. The electric power tool 1 in the first embodiment is provided as the hitting tool. The electric power tool 1 in the fourth embodiment is provided as a drill driver. In this case, the impact load detector 84 in FIG. 1 may be omitted from the electric power tool 1 in the fourth embodiment.

In a fastening stroke of the electric power tool 1, the control unit 110 performs the motor control. The motor control is achieved, for example, by using hardware. The control unit 110 controls each functional block of the control unit 110 to perform the following motor control.

The control unit 110 determines whether the fastening stroke of the electric power tool 1 belongs to the former stage or the latter stage. For example, the control unit 110 determines the stage of the fastening stroke based on the output current signal SIO and a seating determination current signal SIZ.

The fastening stroke corresponds to a period from when a torque starts to be applied to the working subject component to when the fastening torque of the working subject component reaches at the prescribed fastening torque. The former stage of the fastening stroke corresponds to before the working subject component is seated in the fastened object. The latter stage of the fastening stroke corresponds to a period from when the working subject component is seated in the fastened object to when the fastening torque reaches at the prescribed fastening torque.

When the working subject component is seated in the fastened object, the load torque TL largely increases. As a result, the output current IO also largely increases. Thus, the control unit 110 determines whether or not the working subject component is seated in the fastened object, that is, whether the fastening stroke belongs to the former stage or the latter stage based on comparison of the output current signal SIO and the seating determination current signal SIZ.

When determining that the fastening stroke belongs to the former stage, the control unit 110 continues to compare the output current signal SIO with the seating determination current signal SIZ.

When determining that the fastening stroke belongs to the latter stage, that is, detecting seating of the working subject component, the control unit 110 instructs the voltage converter 100 to start the high step-up operation or the low step-up operation.

When the voltage step-up driving signal SUI is supplied to the control unit 110, the control unit 110 supplies the voltage step-up execution signal EVU to the voltage converter 100 in response to detecting that the working subject component is seated. Then, the voltage converter 100 starts the high step-up operation or the low step-up operation. In this case, the voltage converter 100 increases the voltage step-up level over time. When the voltage step-up stop signal SUO is supplied to the control unit 110, the control unit 110 instructs the voltage converter 100 so as not to perform the voltage step-up operation. Alternatively, when the voltage step-up stop signal SUO is received, in response to detecting that the working subject component is seated, the control unit 110 may instruct the voltage converter 100 to perform the standard voltage step-up operation. In this case, the voltage converter 100 does not change the voltage step-up level.

When determining that the working subject component is seated, the control unit 110 calculates the summed rotation amount RP. For example, the control unit 110 calculates the rotation amount of the tool output shaft 50 every constant cycle, and acquires the sum of the rotation amount of the tool output shaft 50, that is, the summed rotation amount RP. The control unit 110 compares the summed rotation amount RP with the reference summed rotation amount RPX to determine whether or not the load torque TL reaches at the prescribed torque TX.

The load torque TL correlates with the fastening torque. The fastening torque correlates with the summed rotation amount RP, and increases with the increase in the summed rotation amount RP. As described above, when the summed rotation amount RP is greater than or equal to the reference summed rotation amount RPX, the load torque TL is greater than or equal to the prescribed torque TX. Thus, the control unit 110 determines whether or not the summed rotation amount RP is greater than or equal to the reference summed rotation amount RPX, thereby determining whether or not the load torque TL is greater than or equal to the prescribed torque TX.

When the summed rotation amount RP is less than the reference summed rotation amount RPX, the control unit 110 determines that the load torque TL is less than the prescribed torque TX. When the summed rotation amount RP is greater than or equal to the reference summed rotation amount RPX, the control unit 110 determines that the load torque TL is greater than or equal to the prescribed torque TX. When the load torque TL is greater than or equal to the prescribed torque TX, the control unit 110 stops rotation of the motor 30.

The electric power tool 1 in the fourth embodiment has the advantages (1) to (5) of the electric power tool 1 in the first embodiment. The electric power tool 1 in the fourth embodiment further has following advantages.

(6) When detecting that the working subject component is seated in the fastened object, the voltage converter 100 starts the low step-up operation or the high step-up operation. Therefore, the electric power tool 1 applies a large torque to the seated working subject component. This may shorten operation time.

Fifth Embodiment

An electric power tool 1 in a fifth embodiment will now be described below.

The electric power tool 1 in the fifth embodiment basically includes the same components as those in the electric power tool 1 in the first embodiment. The same components are given the same reference numerals, and part of all of description thereof is omitted.

The electric power tool 1 in the fifth embodiment is different from the electric power tool 1 in the first embodiment mainly in the following point. The electric power tool 1 in the first embodiment is provided as a hitting tool. The electric power tool 1 in the fifth embodiment is provided as a drill driver. In this case, the impact load detector 84 in FIG. 1 may be omitted from the electric power tool 1 in the fifth embodiment.

The control unit 110 compares the output current signal SIO with a reference output current signal SIX indicating a reference output current IX to determine whether or not the load torque TL reaches at the prescribed torque TX.

The output current IO correlates with the load torque TL. When the output current IO is greater than or equal to the reference output current IX, the load torque TL is greater than or equal to the prescribed torque TX. Thus, the control unit 110 determines whether or not the output current IO is greater than or equal to the reference output current IX, thereby determining whether or not the load torque TL is greater than or equal to the prescribed torque TX.

When the output current IO is less than the reference output current IX, the control unit 110 determines that the load torque TL is less than the prescribed torque TX.

When the output current IO is greater than or equal to the reference output current IX, the control unit 110 determines that the load torque TL is greater than or equal to the prescribed torque TX. When the load torque TL is greater than or equal to the prescribed torque TX, the control unit 110 stops rotation of the motor 30.

The electric power tool 1 in the fifth embodiment has the advantages (1) to (5) of the electric power tool 1 in the first embodiment.

It should be apparent to those skilled in the art that the present invention may be embodied in many other specific forms without departing from the spirit or scope of the invention. Particularly, each of the above embodiments may be modified as follows. Following two or more modification examples may be combined to each other so as not to technically contradict each other.

In the first embodiment, the driving condition setting operation unit 62 is arranged in the electric power tool body 10. In place of this, in a modification example, the driving condition setting operation unit 62 may be arranged in a portable controller provided separately from the electric power tool body 10. In this case, the portable controller wirelessly communicates with the electric power tool body 10. The driving condition setting operation unit 62 in the second to fifth embodiments may be also modified in the same manner.

In the first embodiment, the impact load detector 84 has the acceleration sensor. In place of this, in a modification example, the impact load detector 84 may have a microphone. The microphone supplies a signal, corresponding to sound caused by hitting of the hammer 43, to the control unit 110. The impact load detector 84 in the second and third embodiments may be also modified in the same manner.

In the first embodiment, the voltage converter 100 raises the voltage supplied from the power supply 120. In place of this, in a modification example, the voltage converter 100 may lower the voltage inputted from the power supply 120. In this case, the voltage converter 100 includes, for example, a step-down chopper circuit. The voltage converter 100 in the second to fifth embodiments may be also modified in the same manner.

In the first embodiment, the starting voltage step-up control is achieved by using hardware. In place of this, in a modification example, the starting voltage step-up control is achieved by using software (program) or a combination of software and hardware. The starting voltage step-up control in the second to fifth embodiments may be also modified in the same manner.

In the first embodiment, the control unit 110 calculates the rotation amount of the tool output shaft 50, which is generated by one hitting of the hammer 43, as the unit hitting rotation amount RB. In place of this, in a modification example, the control unit 110 may calculate the rotation amount of the drive shaft 32 or the power conversion unit 40, which is generated by one hitting of the hammer 43, as the unit hitting rotation amount RB. In this case, the rotation amount of the power conversion unit 40 is, for example, the rotation amount of the power transmission shaft 42, the hammer 43, or the anvil 44. The control unit 110 in the second and third embodiments may be also modified in the same manner.

In the first embodiment, when the control unit 110 receives the voltage step-up stop signal SUO, the control unit 110 instructs the voltage converter 100 so as not to perform the voltage step-up operation. In this case, the voltage converter 100 directly supplies the voltage from the power supply 120 to the drive unit 90. In place of this, in a modification example, even when the control unit 110 receives the voltage step-up stop signal SUO, the control unit 110 may instruct the voltage converter 100 to perform the standard step-up operation. The control unit 110 in the second to fifth embodiments may be also modified in the same manner.

In the first embodiment, the electric power tool body 10 may include a display for displaying the operational position of the driving condition setting operation unit 62. The electric power tool body 10 in the second to fifth embodiments may be also modified in the same manner.

In the first embodiment, the control unit 110 performs the starting voltage step-up control. In place of this, in a modification example, the control unit 110 may not perform the starting voltage step-up control. In this case, the control unit 110 may determine whether or not the starting voltage step-up control is performed based on the user's operation of the operation unit.

In the first embodiment, the electric power tool body 10 may have a display for displaying the operational position of the voltage step-up condition setting operation unit 63. The electric power tool body 10 in the second to fifth embodiments may be also modified in the same manner.

In the first embodiment, the control unit 110 determines whether or not the load torque TL is greater than or equal to the prescribed torque TX based on whether or not the number of hits BN is greater than or equal to the reference number of hits BNX. In place of this, in a modification example, the electric power tool 1 may have a torque detection unit for detecting the load torque TL.

The torque detection unit directly detects the load torque TL acting on the tool output shaft 50. The torque detection unit is, for example, a torque sensor. The torque detection unit supplies a load torque signal, corresponding to the load torque TL, to the control unit 110. According to this structure, the control unit 110 directly determines whether or not the load torque TL is greater than or equal to the prescribed torque TX.

In the fifth embodiment, the control unit 110 determines whether or not the load torque TL is greater than or equal to the prescribed torque TX based on whether or not the output current IO is greater than or equal to the reference output current IX. In place of this, in a modification example, the electric power tool 1 may have a driving time measurement unit for measuring the driving time of the motor 30.

The driving time measurement unit measures driving time during which the motor 30 is driven, and generates a driving time signal. For example, the driving time measurement unit starts to measure the driving time in response to outputting of the rotation driving signal ED. The control unit 110 compares the driving time with a reference driving time, thereby determining whether or not the load torque TL reaches at the prescribed torque TX. When the load torque TL is greater than or equal to the prescribed torque TX, the control unit 110 stops rotation of the motor 30. In this modification example, the driving time measurement unit is an example of the driving state detection unit, and the driving time signal is an example of the driving state signal.

The reference driving time correlates with the prescribed torque TX. The load torque TL correlates with the driving time, and increases with the increase of the driving time. Thus, the control unit 110 determines whether or not the driving time is greater than or equal to the reference driving time, thereby determining whether or not the load torque TL is greater than or equal to the prescribed torque TX.

In the first embodiment, the electric power tool body 10 and the power supply 120 may be attached to and detached from each other. In place of this, in a modification example, the electric power tool body 10 may be integrated with the power supply 120.

The invention claimed is:

1. An electric power tool comprising:
    a power supply;
    a motor including a drive shaft;
    a trigger switch to adjust an output of the motor;
    a tool output shaft configured to be driven based on a torque of the drive shaft of the motor;
    a voltage step-up condition setting operation unit that serves as a human machine interface;
    a voltage converter capable of performing a voltage step-up operation to raise a voltage supplied from the power supply and supply a raised voltage to the motor, the voltage converter being capable of changing a voltage step-up level in the voltage step-up operation in accordance with the operation of the voltage step-up condition setting operation unit;
    a driving state detection unit configured to generate a driving state signal corresponding to a driving state of the electric power tool; and
    a control unit configured to determine whether or not a load torque acting on the tool output shaft is greater than or equal to a prescribed torque in accordance with the driving state signal and stop the driving of the motor when the load torque is the prescribed torque or more, wherein
    the control unit is configured to perform a starting voltage step-up control, and
    the voltage converter is configured to, in the starting voltage step-up control, increase the voltage step-up level over time after the operation of the trigger switch.

2. The electric power tool according to claim 1, further comprising:
    a power conversion unit configured to change the magnitude of the torque of the drive shaft transmitted to the tool output shaft,
    wherein the control unit is configured to calculate a rotation amount of the drive shaft, the tool output shaft, or the power conversion unit in accordance with the driving state signal.

3. The electric power tool according to claim 1, further comprising:
    a power conversion unit configured to convert the torque of the drive shaft into an impact load and hit the tool output shaft based on the impact load,
    wherein the control unit is configured to calculate the number of times the power conversion unit hits the tool output shaft in accordance with the driving state signal.

4. The electric power tool according to claim 1, further comprising:
    a power conversion unit configured to convert the torque of the drive shaft into an impact load and hit the tool output shaft based on the impact load,
    wherein the control unit is configured to calculate a rotation amount of one of the drive shaft, the tool output shaft, and the power conversion unit in accordance with the driving state signal wherein the control unit calculates the rotation amount generated by one hitting of the power conversion unit.

5. The electric power tool according to claim 4, wherein the control unit is configured to calculate the number of times the power conversion unit hits the tool output shaft in accordance with the driving state signal when the rotation amount is less than a reference rotation amount.

6. The electric power tool according to claim 1, wherein the driving state detection unit is configured to generate a driving time signal, which indicates driving time of the motor, as the driving state signal.

7. The electric power tool according to claim 1, wherein the driving state detection unit is configured to generate an output current signal, which indicates a current flowing through the motor, as the driving state signal.

8. The electric power tool according to claim 1, wherein the voltage converter is further capable of performing a voltage step-down operation to lower the voltage supplied from the power supply and supply a lowered voltage to the motor.

9. The electric power tool according to claim 1, wherein the voltage converter is configured to continue to increase the voltage step-up level after the operation of the trigger switch until the raised voltage reaches at a reference output voltage.

10. The electric power tool according to claim 1, wherein the voltage converter is configured to increase the voltage step-up level in steps up to a maximum step-up level after the operation of the trigger switch.

* * * * *